United States Patent
Lipowitz et al.

(10) Patent No.: US 11,015,968 B2
(45) Date of Patent: May 25, 2021

(54) FLUID FLOW SENSOR SYSTEM HAVING A UNIVERSAL STEM

(71) Applicant: Mobius Labs, Inc., Albany, NY (US)

(72) Inventors: Frank Lipowitz, Albany, NY (US); Karl Appel, Albany, NY (US); Matthew Cusack, Albany, NY (US)

(73) Assignee: MOBIUS LABS, INC., Troy, NY (US)

( * ) Notice: Subject to any disclaimer, the term of this patent is extended or adjusted under 35 U.S.C. 154(b) by 219 days.

(21) Appl. No.: 16/284,584

(22) Filed: Feb. 25, 2019

(65) Prior Publication Data

US 2019/0265092 A1    Aug. 29, 2019

Related U.S. Application Data

(60) Provisional application No. 62/634,268, filed on Feb. 23, 2018.

(51) Int. Cl.
*G01F 15/18* (2006.01)
*G01F 15/06* (2006.01)
*G01F 15/14* (2006.01)
*E03D 9/00* (2006.01)

(52) U.S. Cl.
CPC ............ *G01F 15/185* (2013.01); *E03D 9/00* (2013.01); *G01F 15/063* (2013.01); *G01F 15/14* (2013.01)

(58) Field of Classification Search
CPC ...... G01F 15/063; G01F 15/14; G01F 15/185; E03D 9/00
See application file for complete search history.

(56) References Cited

U.S. PATENT DOCUMENTS

| | | | |
|---|---|---|---|
| 4,916,762 A | 4/1990 | Shaw | |
| 5,327,931 A * | 7/1994 | Royalty | E03D 1/00 137/410 |
| 5,546,009 A * | 8/1996 | Raphael | G01F 23/242 324/556 |
| 6,802,084 B2 * | 10/2004 | Ghertner | E03D 1/00 340/605 |
| 6,877,170 B1 | 4/2005 | Quintana et al. | |

(Continued)

OTHER PUBLICATIONS

Non-Final Office Action dated Feb. 21, 2019 for U.S. Appl. No. 15/417,754, filed Jan. 27, 2017; pp. 14.

*Primary Examiner* — Natalie Huls
(74) *Attorney, Agent, or Firm* — Hoffman Warnick LLC

(57) ABSTRACT

A universal fluid flow sensor system and method installable in a toilet tank. A system is disclosed that includes a housing that contains a power source and an event processing system; a flow sensor coupled to a base of the housing, wherein the flow sensor provides flow rate data to the event processing system, the flow sensor having an inlet adapted to receive an inflow of water from a fill tube and an outlet adapted to expel an outflow; a universal stem that extends from the housing and includes at least two different mounting systems adapted to seat the housing onto different overflow tube types, wherein the universal stem includes an elbow assembly configured to receive and redirect the outflow into an overflow tube; and a pair of cylindrical probes positioned in parallel within the elbow assembly, wherein the probes activate the event processing system in response to a detection of water contacting the probes.

19 Claims, 12 Drawing Sheets

(56) References Cited

U.S. PATENT DOCUMENTS

| | | | |
|---|---|---|---|
| 6,934,977 B1* | 8/2005 | Quintana | E03D 11/00 4/427 |
| 7,743,436 B1 | 6/2010 | Schuster et al. | |
| 8,166,996 B2* | 5/2012 | Canfield | E03D 11/00 137/389 |
| 2003/0145371 A1 | 8/2003 | Ghertner et al. | |
| 2004/0199989 A1 | 10/2004 | Trolio | |
| 2007/0125429 A1 | 6/2007 | Kandl | |
| 2008/0141447 A1 | 6/2008 | Bowcutt et al. | |
| 2010/0000013 A1 | 1/2010 | Williams | |
| 2013/0124113 A1 | 5/2013 | van Dal | |
| 2015/0059074 A1 | 3/2015 | Davies | |
| 2015/0089730 A1* | 4/2015 | Bekki | E03D 1/14 4/314 |
| 2015/0323412 A1* | 11/2015 | Stoltz | E03D 11/13 700/282 |
| 2016/0097665 A1 | 4/2016 | Becerra et al. | |
| 2016/0265208 A1 | 9/2016 | Brackett, Sr. et al. | |
| 2016/0350880 A1* | 12/2016 | Tyner | G06Q 50/06 |
| 2017/0212533 A1* | 7/2017 | Brody | G01F 15/18 |
| 2018/0216742 A1* | 8/2018 | Korten | G01L 7/082 |
| 2018/0230680 A1* | 8/2018 | Pieczynski, II | E03B 7/071 |
| 2019/0234786 A1* | 8/2019 | Klicpera | G01F 15/063 |
| 2020/0363285 A1* | 11/2020 | Fung-A-Wing | G01M 3/40 |

* cited by examiner

FLUID FLOW SENSOR SYSTEM HAVING A UNIVERSAL STEM

RELATED CASES

This provisional application claims the benefit of US provisional application ENHANCED FLUID FLOW SENSOR SYSTEM, Ser. No. 62/634,268 filed on Feb. 21, 2018 and is related to a co-pending application, Ser. No. 15/417,754, FLUID FLOW SENSOR SYSTEM AND METHOD, the contents of which are hereby incorporated by reference.

TECHNICAL FIELD

The subject matter of this invention relates to fluid flow sensing and measurement systems, and more particularly to an Internet of Things (IoT) based system for sensing and measuring water flow and leaks in household appliances such as toilets and the like.

BACKGROUND

As water resources become more scarce and expensive, water management in large facilities such as apartments, hotels, etc., will continue to become more and more important. Among the challenges facility owners and managers face is to ensure that water waste is minimized.

One area where water waste is commonplace involves leaking bathroom appliances such as toilets. A simple slow leak may go undetected for some time as the toilet will continue to operate, but will repeatedly discharge water as though it was partially flushed. More involved leaks could result in an overflow situation causing significant flood damage to the facility.

SUMMARY

Aspects of the disclosure provide an Internet of Things (IoT) based system for sensing and measuring water flow and detecting leaks in household appliances such as toilets. A sensor system is provided that will automatically detect and measure water flow in a toilet.

A first aspect includes universal fluid flow sensor system installable in a toilet tank, comprising: a housing that contains a power source and an event processing system; a flow sensor coupled to a base of the housing, wherein the flow sensor provides flow rate data to the event processing system, the flow sensor having an inlet adapted to receive an inflow of water from a fill tube and an outlet adapted to expel an outflow; a universal stem that extends from the housing and includes at least two different mounting systems adapted to seat the housing onto different overflow tube types, wherein the universal stem includes an elbow assembly configured to receive and redirect the outflow into an overflow tube; and a pair of cylindrical probes positioned in parallel within the elbow assembly, wherein the probes activate the event processing system in response to a detection of water contacting the probes.

A second aspect discloses universal fluid flow sensor system installable in a toilet tank, comprising: a housing that contains an event processing system; a flow sensor that provides flow rate data to the event processing system, the flow sensor having an inlet adapted to receive an inflow of water from a fill tube and an outlet adapted to expel an outflow; a universal stem that extends from the housing and includes at least two different mounting systems, wherein the universal stem includes an elbow assembly configured to receive and redirect the outflow; and a pair of probes positioned in parallel within the elbow assembly, wherein the probes activate the event processing system in response to a detection of water contacting the probes.

A third aspect discloses a fluid flow sensor system installable in a toilet tank, comprising: a housing that contains an event processing system that includes an event detection system, a data collection system and a communication system; a flow sensor that provides flow rate data to the event processing system, the flow sensor having an inlet adapted to receive an inflow of water from a fill tube and an outlet adapted to expel an outflow; a stem that extends from the housing and is mountable in an overflow tube; and a pair of probes that form a short circuit when water physically bridges both probes; wherein the event processing system includes: a sleep mode in which only the event detection system is active to detect a water flow event, a data collection mode in which the data collection system is activated to collect flow rate data during the water flow event, and a communication mode in which flow rate data is periodically transmitted to a remote service.

BRIEF DESCRIPTION OF THE DRAWINGS

These and other features of this invention will be more readily understood from the following detailed description of the various aspects of the invention taken in conjunction with the accompanying drawings in which.

Figure 1:
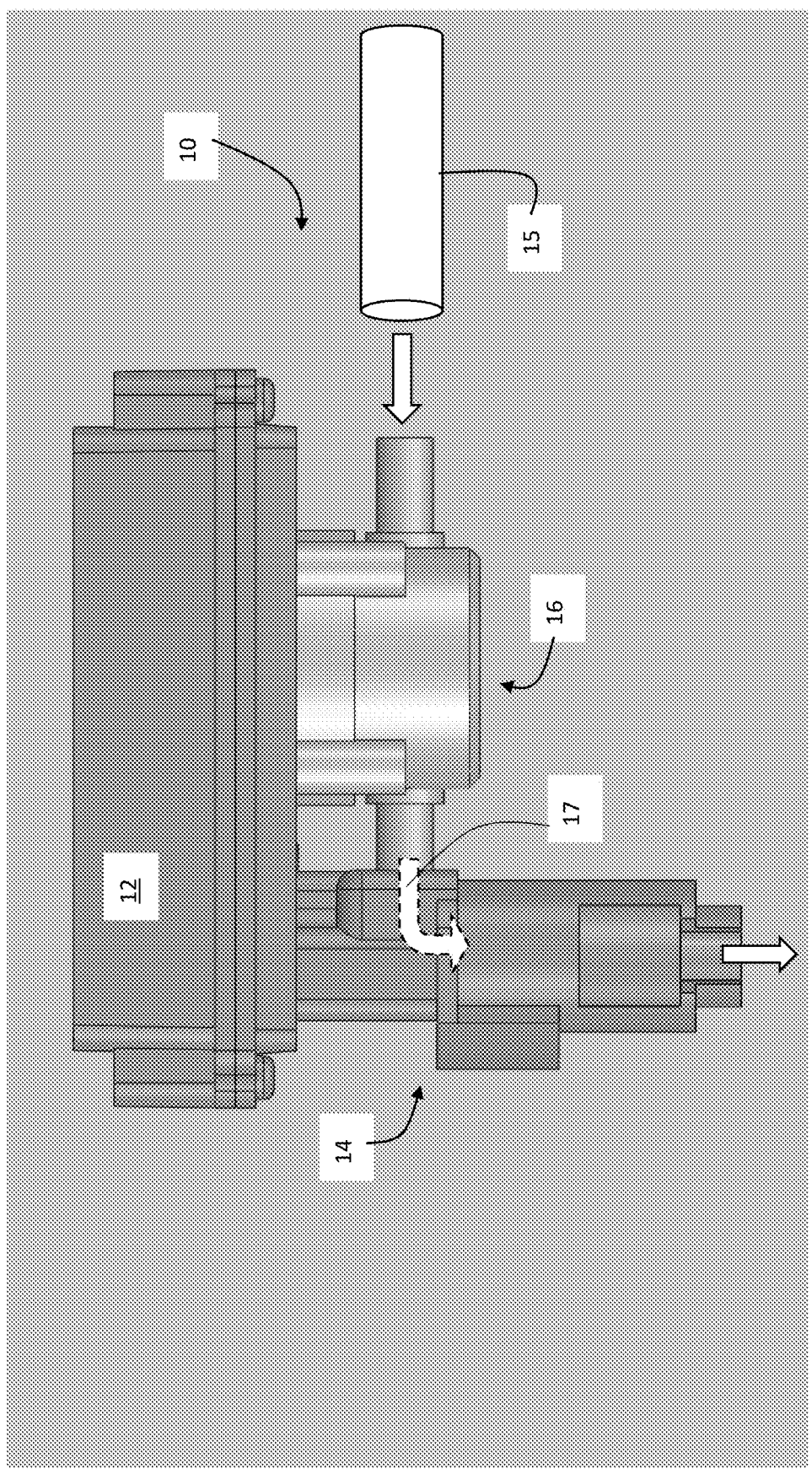
FIG. 1 depicts a side view of a water flow sensor according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Aspects of this disclosure include an Internet of Things (IoT) based system for sensing and measuring water flow and detecting leaks in appliances such as toilets. As shown in FIG. 1, an enhanced water flow sensor system 10 (i.e., "sensor system 10") is provided that fits into the tank of a toilet, measures water consumption, and communicates wirelessly with a remote data processing service that identifies leaks, reports demand data, issues alert conditions, calculates pressure, etc.

Almost all conventional toilets utilize water that is stored in a tank and released when flushed. After each flush, a re-fill "event" occurs within the toilet that includes a flow of water through a flexible fill tube and into an overflow tube. If there is a leak or other performance issue with the toilet (e.g., a malfunctioning flapper), the toilet will flow more water than is necessary via the fill tube during an event.

The present invention provides an event processing system 70 (FIG. 11) that operates in three modes to efficiently manage power consumption: (1) a low power sleep mode that detects the occurrence of an event using a very low power probe, (2) a data collection mode that collects flow data (including a flow rates) in response to a detected event using a secondary low power mode, and (3) a communication mode to periodically communicate collected flow data to a remote service. Accordingly, the event processing system 70 effectively minimizes power usage of the sensor system 10.

Sensor system 10 generally includes: (1) a housing 12 that contains the event processing system 70 and an associated power source (not shown); (2) a flow sensor 16 that measures flow rates between an inlet and outlet; (3) a probe that detects a water flow event during the sleep mode and activates the data collection mode within the event processing system; and (4) a universal stem 14 for mounting the sensor system 10 onto different types of toilet overflow tubes and discharging water flow therein.

As shown by the arrows in FIG. 1, during a flush event, water flows through flexible tube 15, through water flow sensor 16, down through the universal stem 14, and out to an overflow tube (not shown). Along the way, internal probes located proximate arrow 17 detect the event and activate the data collection mode of the event processing system 70 located in the housing 12.

Water flow sensor 16 may for example comprise a Hall Effect sensor having an internal turbine or the like that rotates in response to a flow of water and emits pulses based on the flow-rate. Namely, the greater the flow rate, the greater the frequency of pulses. Event processing system 70 is configured to count and capture a number of pulses at predefined time intervals during the water flow event. For example, event processing system 70 may capture a signal count value every two seconds. The result is a packet of event data consisting of a series of flow rate values for a given flow event, e.g., ($t_1$=20, $t_2$=22, $t_3$=19, $t_4$=20, $t_5$=21, $t_6$=18 . . . $t_{30}$=17). Each value may for example represent the number of times a turbine spun during a two second interval.

At a predetermine time thereafter, packets of the event data are wirelessly transmitted to a remote data processing service for analysis in a communication mode. Transmission may occur at the time of the event, or any time thereafter. In one illustrative embodiment, a collection of event data records are transmitted in a batch mode at predefined time intervals, e.g., every 8 hours.

In the depicted configuration, inputted water flow enters the water flow sensor 16 and exits into the universal stem 14 (that includes one or more probes) which redirects the flow downward within the stem 14, where the outputted water flow empties into an overflow tube.

Figure 2:
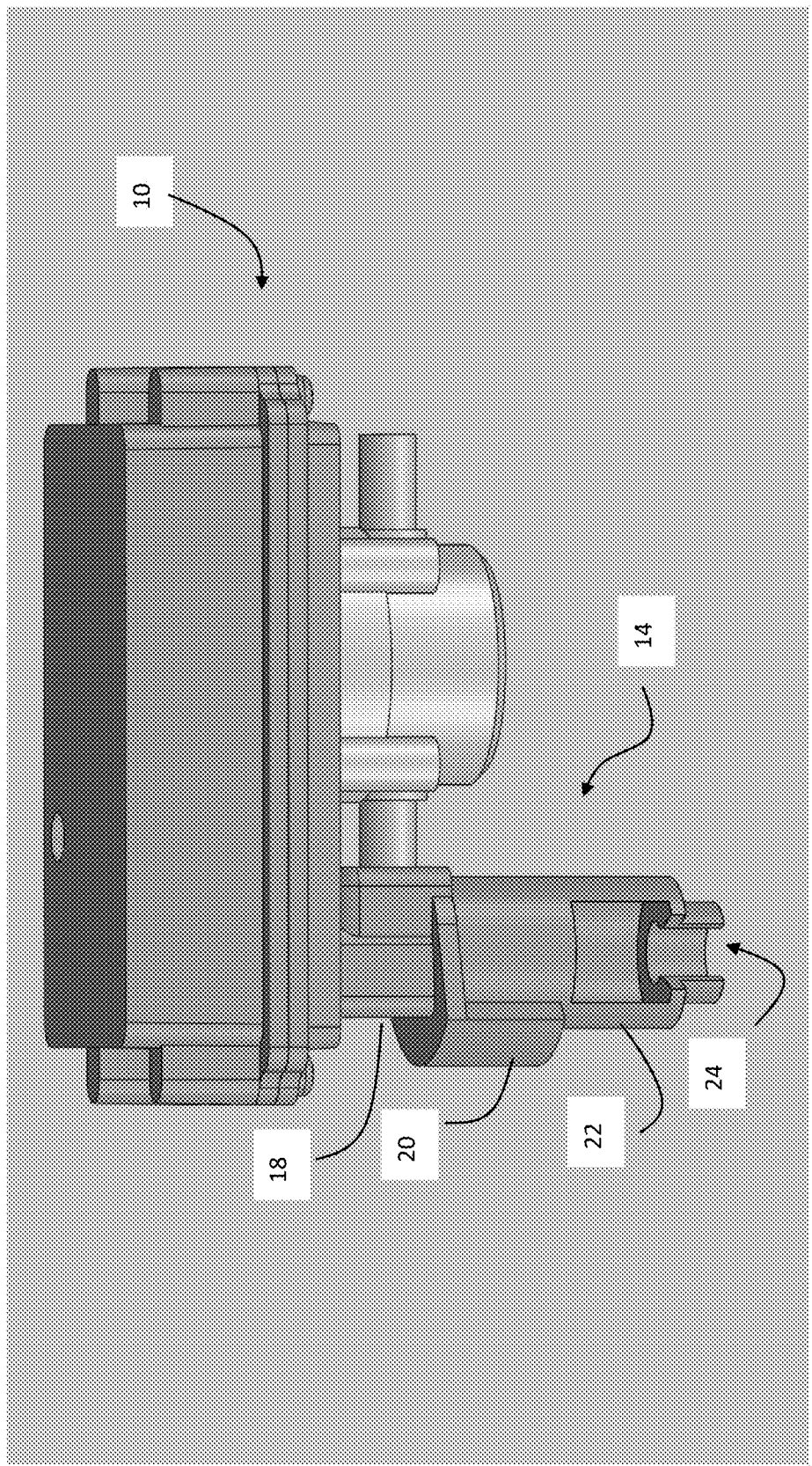
FIG. 2 depicts a perspective view of the water flow sensor of FIG. 1 according to embodiments.

FIG. 2 depicts a perspective view of the sensor system 10 in which the universal stem 14 is shown in more detail. In particular, universal stem 14 is configured with multiple mounting systems such that sensor system 10 can be seated on different types of overflow tubes. In this illustrative embodiment, stem 14 includes: an elbow section 18 the redirects the water flow downward, a shaft 22, a partial collar 22 that is substantially concentric to the shaft 22 (to provide a first mounting system), and a stem mounting receptor 24 at the end of the shaft 22 (to provide a second mounting system). Other mounting systems may likewise be incorporated into the stem 14.

Figure 3:
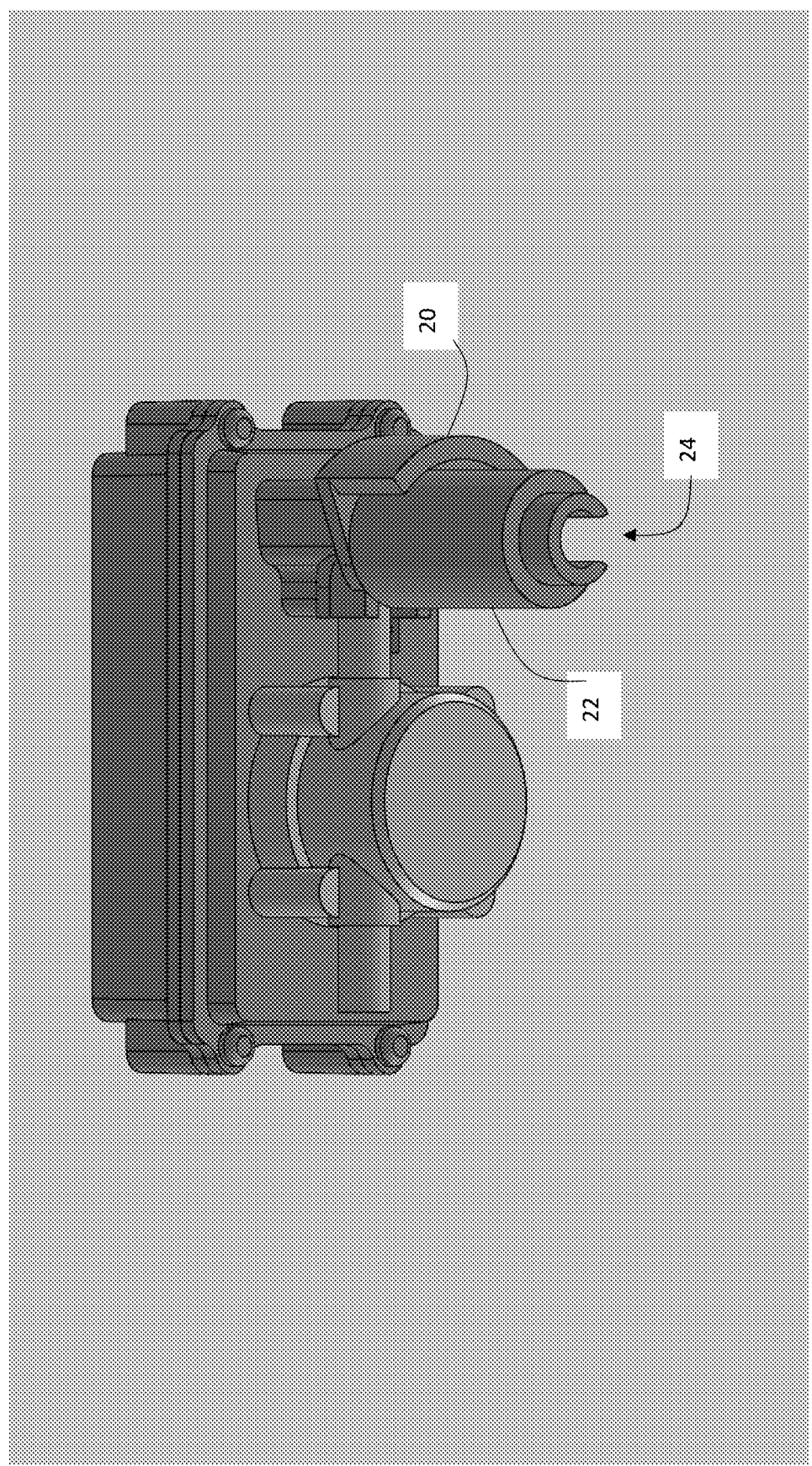
FIG. 3 depicts a back side perspective view of the water flow sensor of FIG. 1 according to embodiments.
Figure 7:
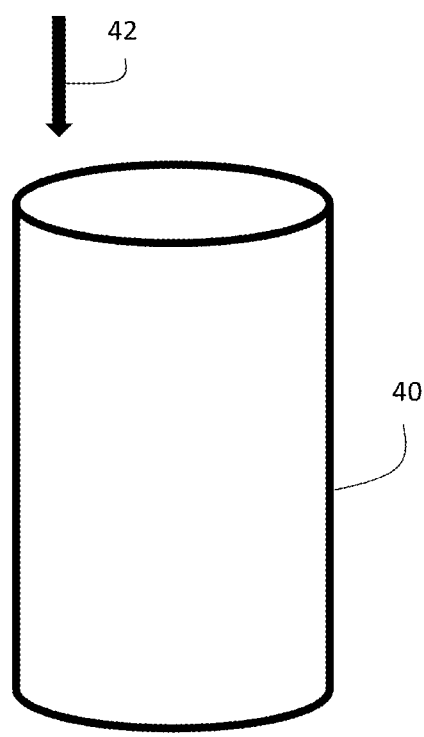
FIG. 7 depicts a standard toilet overflow tube onto which the water flow sensor can be seated according to embodiments.
Figure 9:
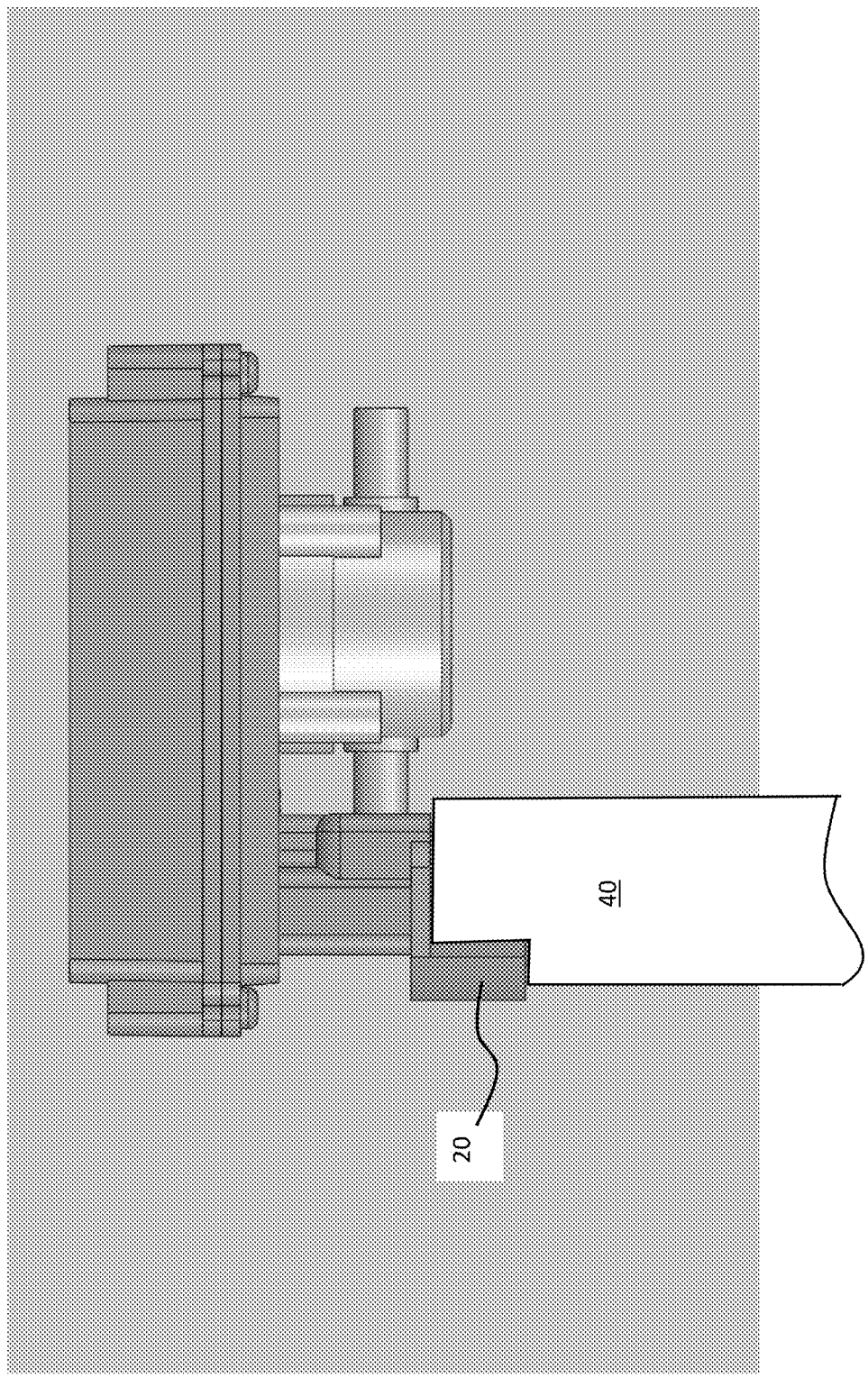
FIG. 9 shows a sensor system attached to a canister flush valve type overflow tube in accordance with an embodiment.

FIG. 3 depicts a bottom perspective view of the sensor system 10 that shows the partial collar 20 spatially separated from the shaft 22. The gap between the partial collar 20 and shaft 22 allows the stem to be seated on top of a first type of overflow tube 40 comprising a standard flapper style toilet drain tube used with a float type activator, shown in FIG. 7. The gap is designed to mate with a top rim of the tube 40 by simply lowering the shaft into the tube along arrow 42. An example of the stem seated on a standard overflow tube 40 is shown in FIG. 9.

Figure 8:
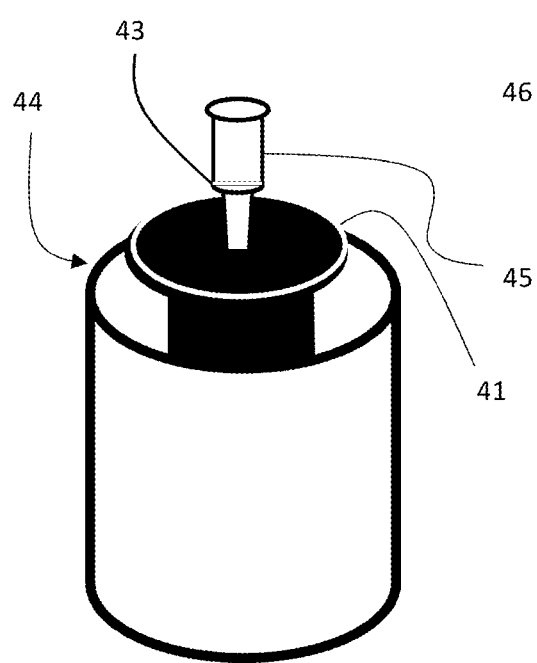
FIG. 8 depicts a canister flush valve type of toilet overflow tube onto which the enhanced water flow sensor can be seated according to embodiments.
Figure 10:
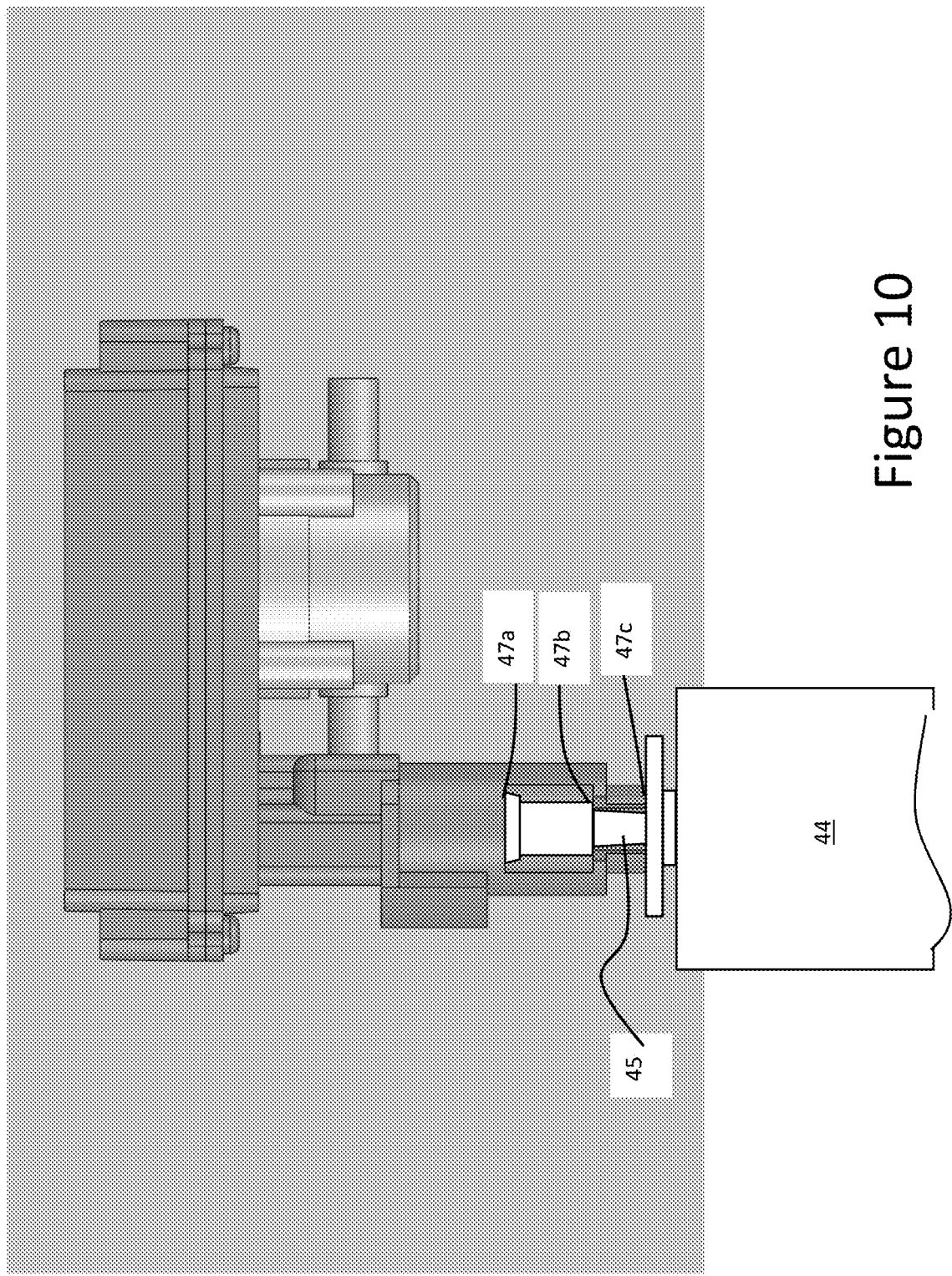
FIG. 10 shows a sensor system attached to a canister valve type overflow tube in accordance with an embodiment.

FIG. 8 depicts a second type of overflow tube, referred to as a "canister flush valve" 44, that includes a plunger tip or "stem" 45. The stem 45 is stepped 43 with different circumferences and extends up from a plate 41. The stem mounting receptor 24 (FIG. 2) is adapted to firmly "snap" onto these features of the stem 45 and hold the sensor system 10 in place above the canister flush valve 44. An example of the stem 45 seated on canister flush valve 44 is shown in FIG. 10. The stem 45 is held in place by pressing against three surfaces of the stem mounting receptor 24, including a top surface 47a that presses against the top of the stem 45, an intermediate ledge surface 47b that mates with the step 43, and a bottom surface 47c that presses against the plate 41 of the stem 45. It is understood that other configurations could likewise be employed to form the stem mounting receptor 24, e.g., the opening could be shaped in substantially the exact form of the stem 45.

Figure 4:
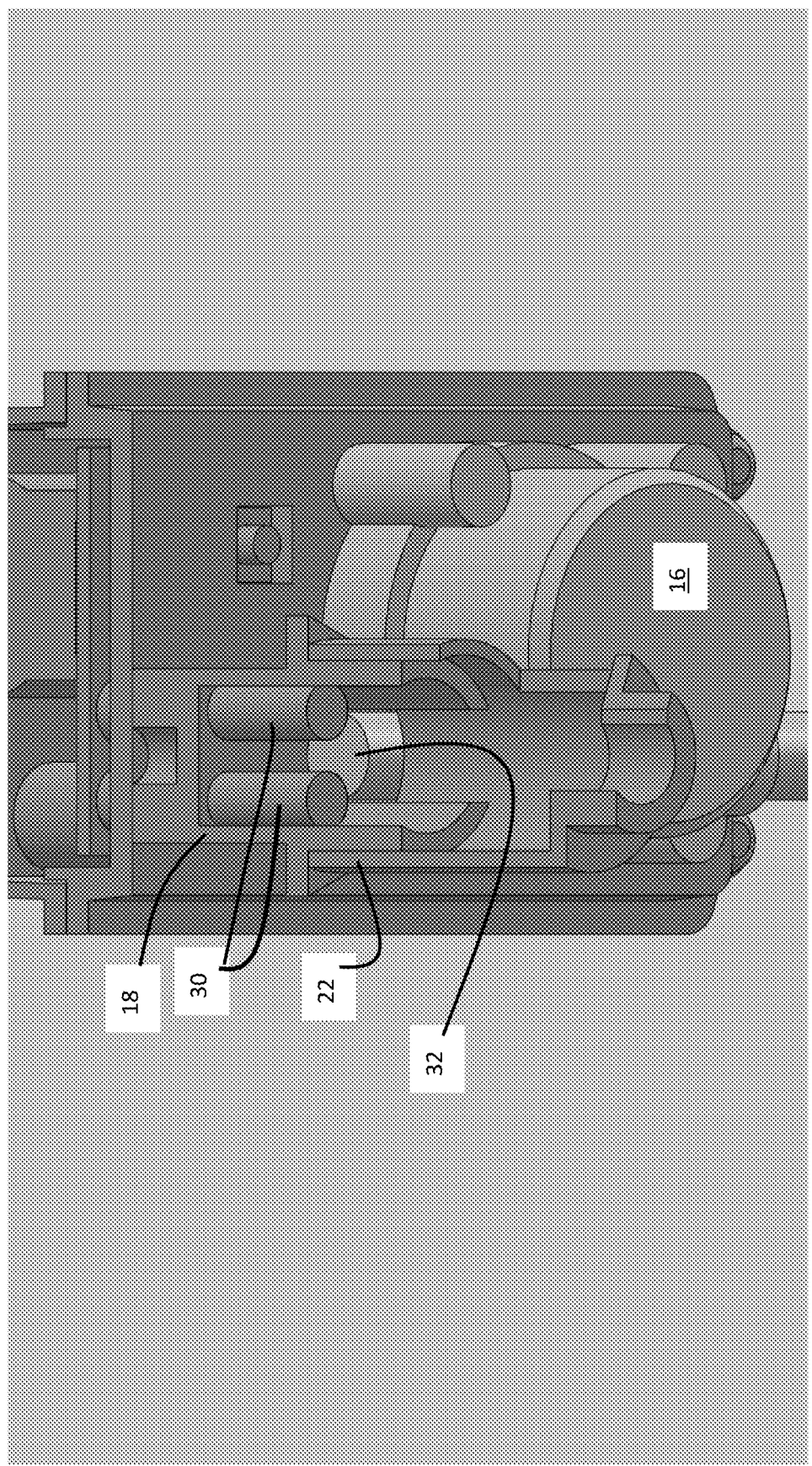
FIG. 4 depicts a cut-away bottom perspective view of the water flow sensor of FIG. 1 according to embodiments.

Referring now to FIG. 4, a bottom perspective cutaway view is depicted to show a pair of probes 30, which resides within the elbow section 18 of the stem 22. As water exits the flow sensor 16 via opening 32, the water passes between the probes 30 causing a short circuit to activate the data collection mode of the event processing system 70.

In particular, when probes 30 detect a flow of water (i.e., a flow event) an "activate" signal (i.e., turn on or wake up the data collection mode) is sent to the event processing system 70. Probes 30 essentially comprise a switch in which a water droplet touching both probes 30 acts a conductor to complete the connection between the pair of probes 30. The probes 30 therefore only utilize a small amount of power from the power source (e.g., 5 micro Amps) in sleep mode. Thus, by using the probes 30, the system 10 itself need not be fully powered 24/7, thus substantially increasing battery life.

Probes 30 may for example employ a voltage potential of about 1 volt (e.g., between 0.7 and 1.3 volts). The potential may be programmably adjustable before installation or after, e.g., based on water type (e.g., hard versus soft) using a comparator circuit that resides with the housing 12. The probes 30 themselves may comprise threaded metal posts (e.g., cylinders, hexagon or square profile posts, etc.) held in place by form fitting cavities in the elbow section 18 of the stem 22. In one illustrative embodiment, the posts comprise solid aluminum with a chromium coating and are, for example, spaced with a gap of about 1/10". Obviously, different types of metal and spacing may be employed.

Figure 5:
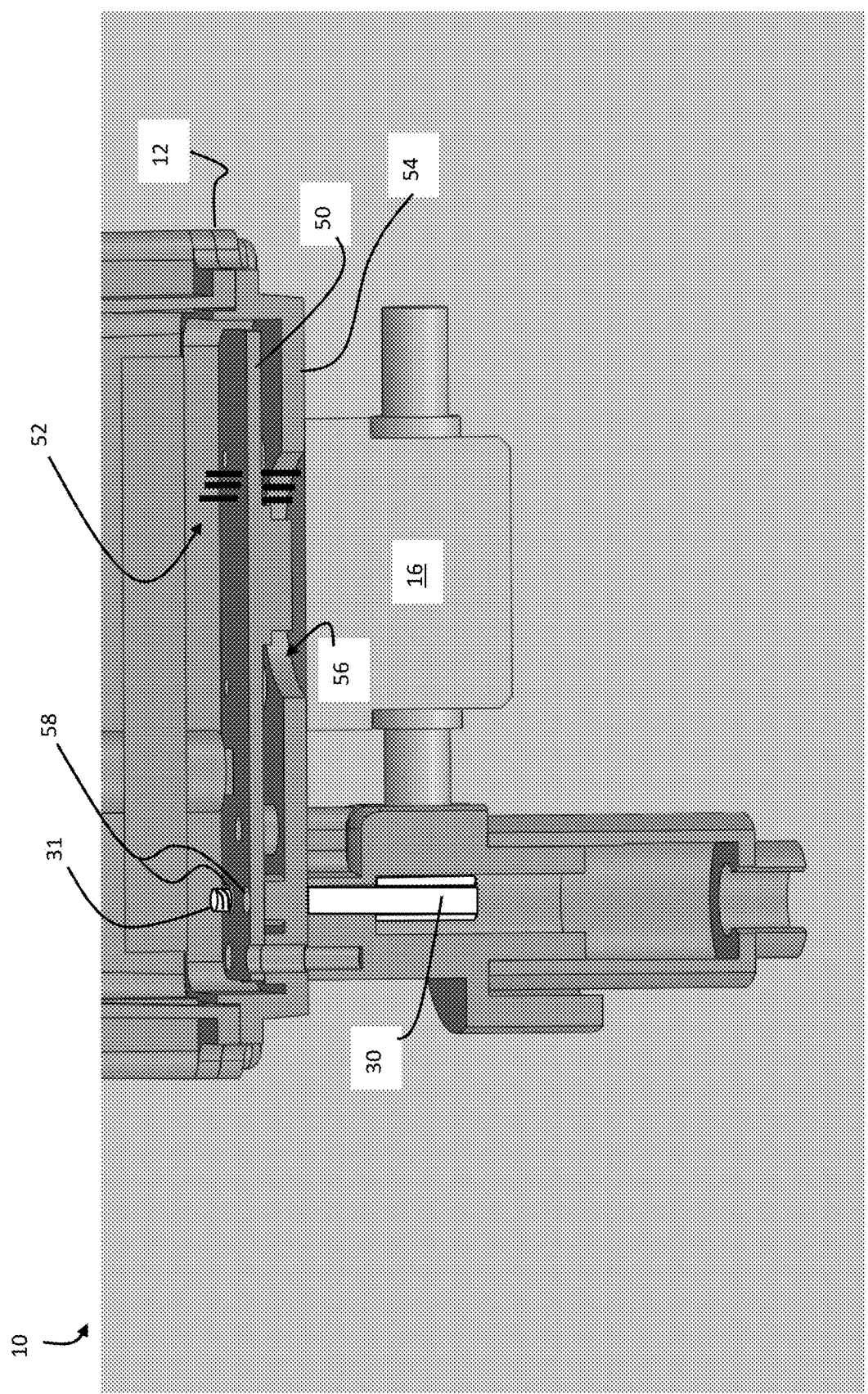
FIG. 5 depicts a side cut-away view of the water flow sensor of FIG. 1 according to embodiments.

FIG. 5 depicts a cutaway side perspective view of the sensor system 10 that shows circuit board 50 inside housing 12, which implements the event processing system 70 and hold a power source such as battery. A challenge with any electronic device that sits in a toilet tank is dealing with moisture. While it is relatively straight forward to keep a fully enclosed plastic enclosure water tight, issues arise, e.g., with respect to housing 12 due to the fact that electrical signals must be collected from outside the housing 12. Namely, flow sensor 16 and probes 30 reside external to the housing 12, but must be electrically coupled to the circuit board 50 inside the housing 12. In order to mitigate moisture issues, in one embodiment, no flexible wiring is utilized to connect the flow sensor 16 and probes to the circuit board 50.

Instead, with respect to the flow sensor 16, conductive pins 52 that are integrated in and extend from commercially available off-the-shelf flow sensors, are positioned such that the pins 52 pass directly through the base 54 of the housing 12 and into metal plated holes in the printed circuit board 50, where they can be soldered with no wiring. A circular cutout 56 may be utilized on housing base 54 where the flow sensor 16 mates and provides a water tight seal with the exterior surface of the base 54.

In a similar fashion, probes 30 may comprise solid posts (e.g., cylinders or the like) that pass up through water tight sealed holes in the housing base 54 and through predrilled holes 58 in the circuit board 50. A threaded end 31 of each probe 30 may extend through or flush with the circuit board 50, which can be mechanically and electrically secured with a nut (not shown). Alternatively, the end of the probe 30 may be internally threaded and mount flush with the circuit board 50 such that a machine threaded screw can connect the probe to the circuit board 50.

Figure 6:
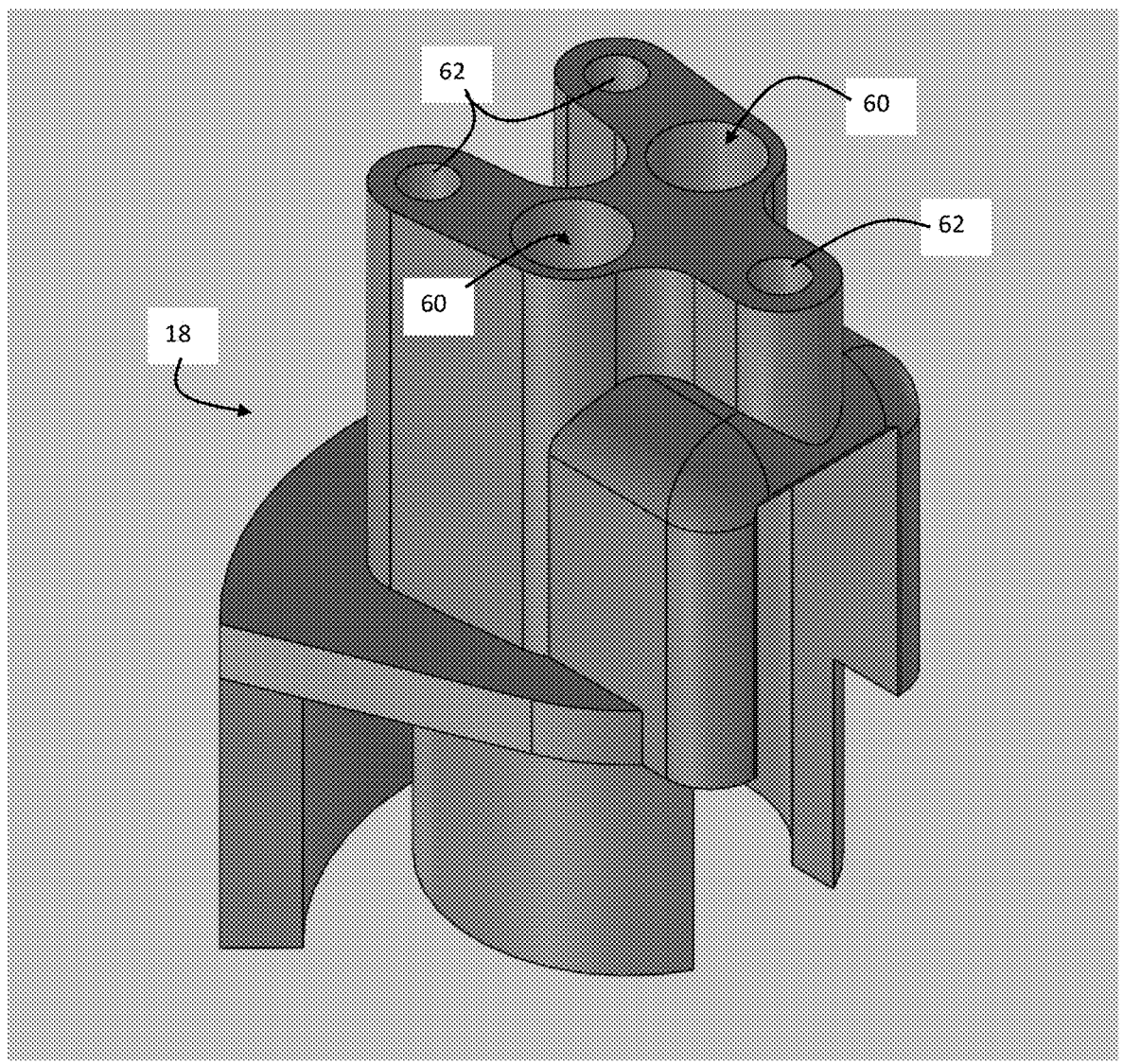
FIG. 6 depicts a perspective view of the elbow section of the water flow sensor of FIG. 1 according to embodiments.

In order to ensure high reliability, probes 30 must be aligned precisely to avoid false or missed event detections. FIG. 6 depicts an illustrative cut-away view of elbow section 18 (see, e.g., FIGS. 2 and 4) that achieves precision alignment of the probes (not shown). As depicted, probe cavities 60 are incorporated into the elbow section 18 of the stem 14 for securely holding and positioning the probes. Conduits 60 may provide a water tight seal that surround each probe 30 and hold them in place. Epoxy or other sealants may be added to ensure no water makes its way up through the cavities 60. Connection holes 62 are utilized to fasten the stem to the housing 12, e.g., with nuts and bolts.

Water tight sealing throughout may be achieved with gaskets, neoprene foam, epoxy, or any other technique.

Figure 11:
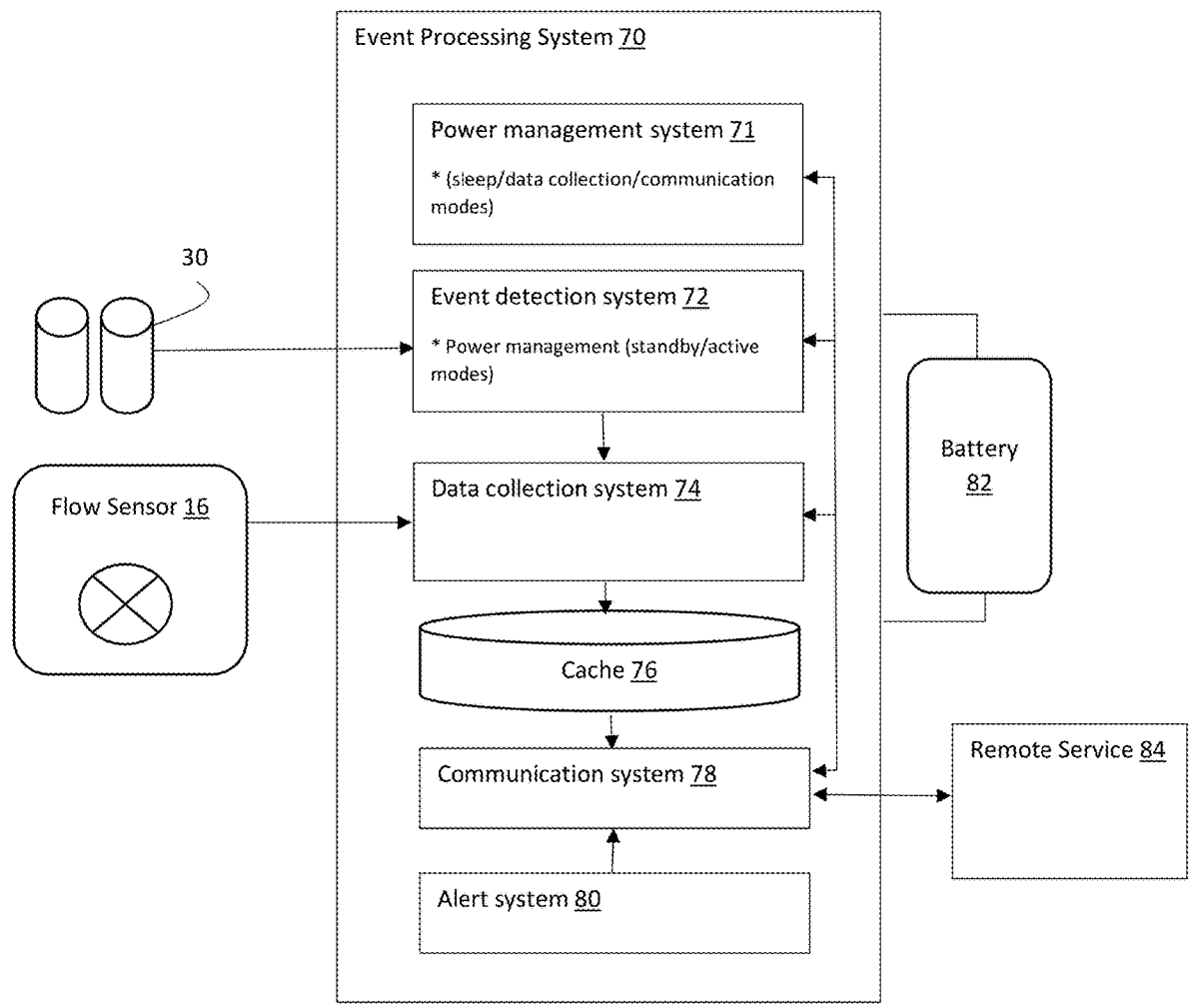
FIG. 11 depicts a system diagram of an event processing system in accordance with an embodiment.

FIG. 11 depicts a block diagram of an illustrative event processing system 70. In one embodiment, event processing system 70 operates within an Internet-of-Things (IoT) platform, along with a larger set of event processing systems, e.g., installed in other toilets and appliances. In this illustrative approach, the IoT platform may be implemented using any protocol, such as 6LoWPAN (IPv6 over Low power Wireless Personal Area Networks).

Event processing system 70 may be implemented with a circuit board that includes special purpose hardware and/or a combination of hardware and software. Components include power management system 71 that implements sleep mode, data collection mode, and communication mode, an event detection system 72 that activates the data collection mode (from sleep mode) in response to a probe 30 signal, indicating that a flow event is occurring. Once activated, a data collection system 74 begins collecting flow data from flow sensor 16 and may for example store chunks of data in a cache 76. In one illustrative approach, data collection system 74 stores chunks consisting of one minute of data in which each one-minute chunk includes 30 data points made up of count or flow-rate values recorded every two seconds. Obviously other data chunking options may be utilized, e.g., values collected every one second, every three seconds, etc.

In communication mode, communication system 78 sends the flow data to a remote service 84 for analysis. Flow data may be sent at the time a given flow event occurs, or in batch mode at some time thereafter (e.g., every eight hours). Any wireless communication protocol may be utilized. Furthermore, communications can be implemented in any manner, e.g., client-server, pier-to-pier, machine-to-machine, smart-grid, etc.

In addition, an alert system 80 may be implemented to periodically test the battery and other aspects of the sensor system 10 and report any system failures or warnings to the remote data processing system 68.

In one illustrative embodiment, event detection system 72 and data collection system 74 are implemented with a microcontroller that allows the event detection system 72 to be active at all times and keeps the data collection system 74 in a sleep mode places until an event is detected. Cache 76 and communication system are implemented with a wifi bridge. Illustrative power requirements in sleep mode are on the order of a few microAmps (e.g., about 5-10), in data collection mode are on the order of a few milliAmps (e.g., about 5-10), and in communication mode are on the order of a few hundred milliAmps (e.g., about 100-300).

Figure 12:
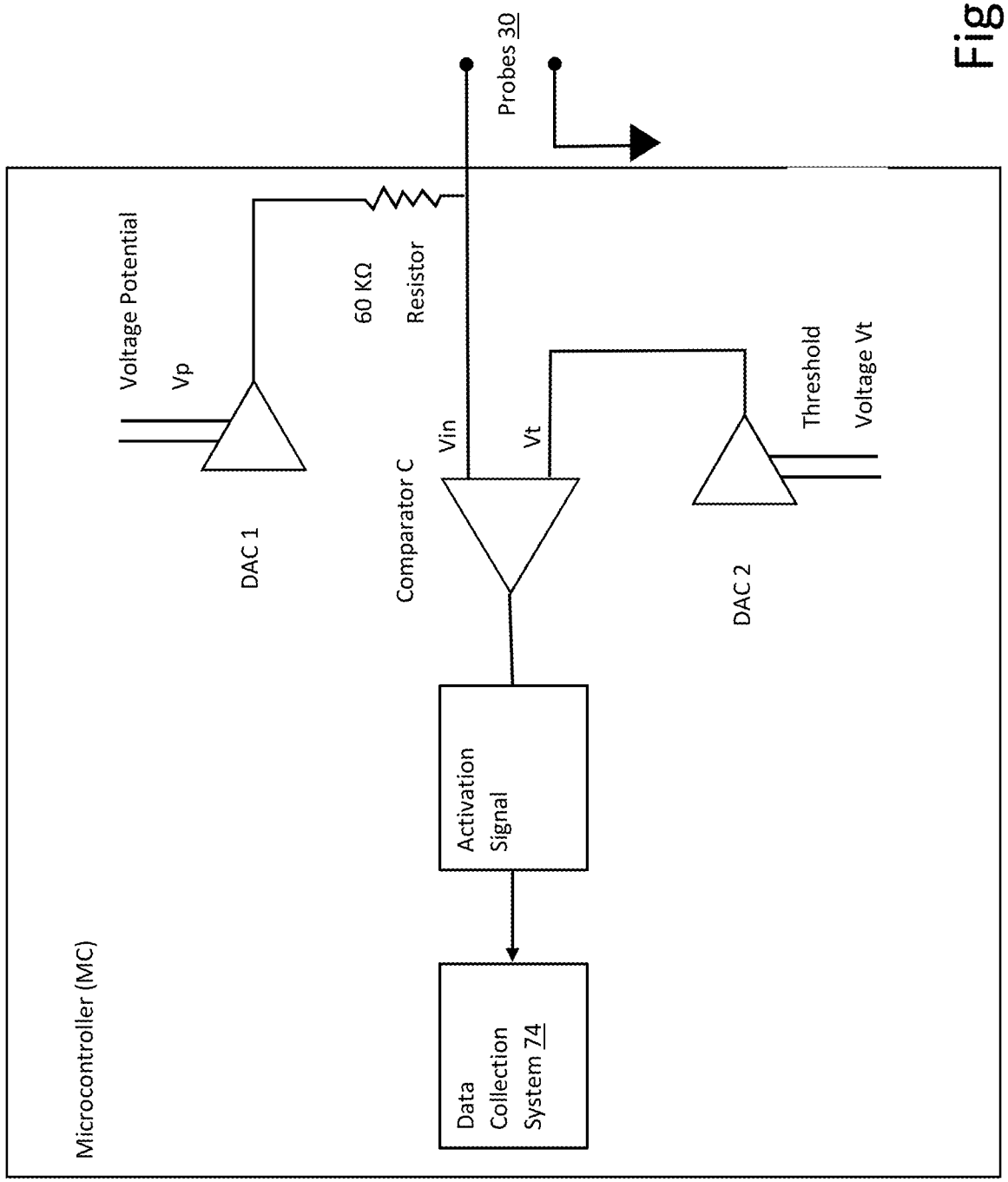
FIG. 12 depicts an event detection circuit of an event processing system in accordance with an embodiment.

FIG. 12 depicts an illustrative circuit with a microcontroller (MC) for activating the event processing system 70 from sleep mode to data collection mode. As shown, a first digital to analog converter (DAC 1) is programmatically set to a desired voltage potential Vp (e.g., about 1 volt) across the probes 30. A second DAC (DAC 2) is programmatically set to a desired threshold voltage Vt (e.g., about 80% of Vp). When water contacts both probes 30, a short occurs and the input Vin going into comparator C drops below Vt. This result causes C to output an activation signal to the data collection system 74, causing data collection system 74 to wake up and begin collecting data. The DACs can be programmed based on the type of water in the geography where the system is installed (e.g., hard water versus soft water). Additionally, the DACs can be updated dynamically based on feedback from within the system, e.g., in response to mineral build-up on the probes.

Figure 13:
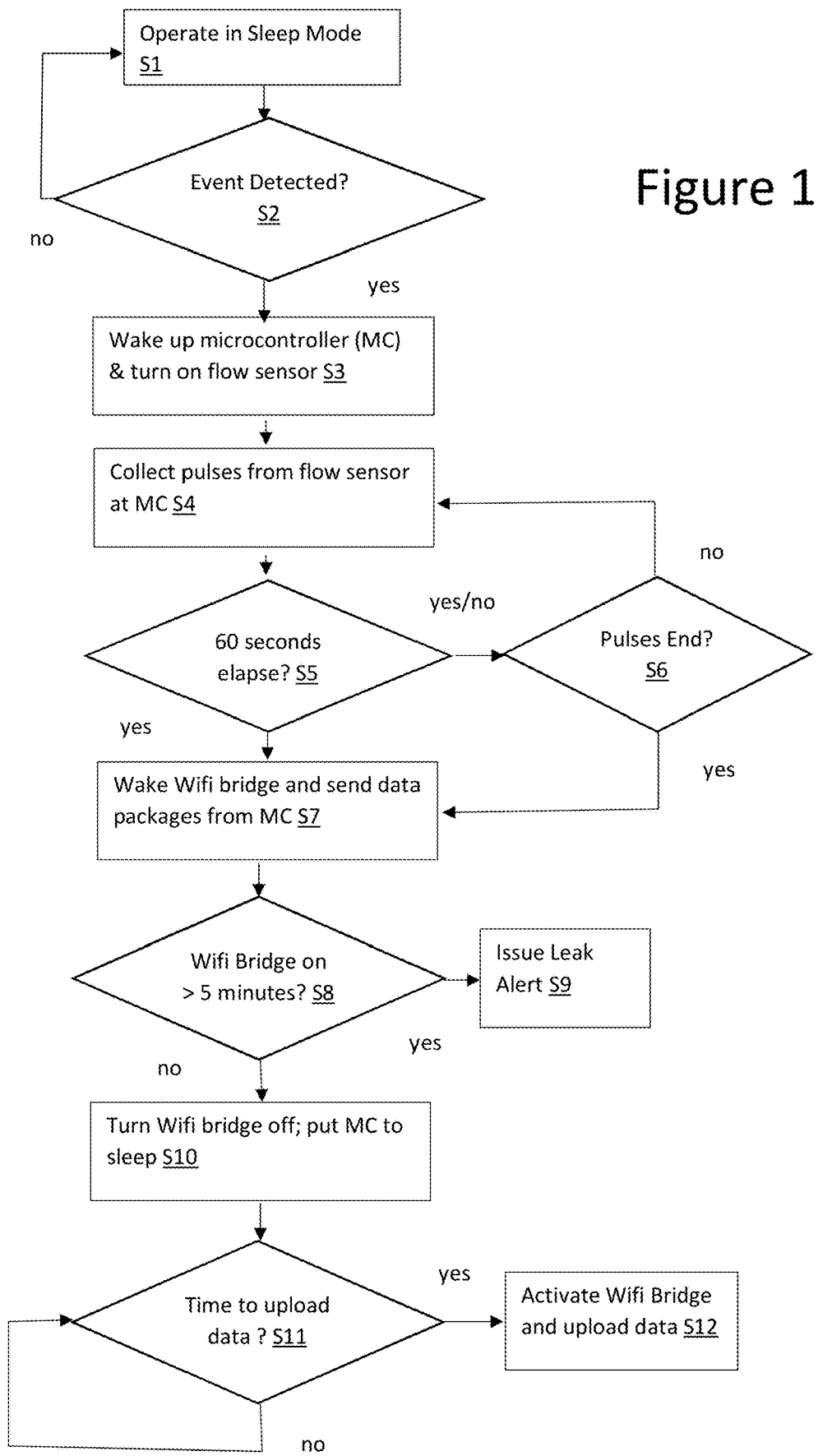
FIG. 13 depicts a flow diagram of an event processing system in accordance with an embodiment.

FIG. 13 depicts an illustrative process for implementing power management. At S1, the system 10 operates in sleep mode such that the only elements active are the circuit shown in FIG. 12 and, e.g., a low power clock. At S2, if an event is detected, the microcontroller MC is woken up along and the flow sensor 16 is turned on at S3. At S4, pulses are collected from the flow sensor by the MC, e.g., flow rate counts are collected every two seconds. At S5 and S6, if 60 seconds (or some other packet threshold value) elapses and/or the pulses end, the wifi bridge is woken up at S7 and a packet of collected flow data (containing up to 60 seconds of data) is sent to the wife bridge. If the pulses do not end, pulse data continues be collected and sent to the wifi bridge in packets containing 60 seconds of flow data (or less if the event ends before the next 60 second interval).

At S8, a check is made to determine if the wifi bridge has been collecting data for more than a leak detection threshold period (e.g., 5 minutes). If so, a leak is presumed and an alert is communicated to the remote service 84. If the leak detection threshold period was not exceeded, the wifi bridge is turned off at S10 and the MC is put back into sleep mode. At S11, a determination is made if it is time to upload data to the remote service (e.g., using the low power clock in the MC), and if so, the wifi bridge is activated and data is uploaded at S12.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A universal fluid flow sensor system installable in a toilet tank, comprising:
    a housing that contains a power source and an event processing system;
    a flow sensor coupled to a base of the housing, wherein the flow sensor provides flow rate data to the event processing system, the flow sensor having an inlet adapted to receive an inflow of water from a fill tube and an outlet adapted to expel an outflow;
    a universal stem that extends from the housing and includes at least two different mounting systems adapted to seat the housing onto different overflow tube types, wherein the universal stem includes an elbow assembly configured to receive and redirect the outflow into an overflow tube; and
    a pair of probes comprised of posts positioned in parallel within the elbow assembly, wherein the probes activate the event processing system in response to a detection of water contacting the probes.

2. The system of claim 1, wherein the event processing system is implemented with a printed circuit board and wherein the flow sensor includes a set of output pins that are coupled directly to the printed circuit board.

3. The system of claim 2, wherein the probes are coupled directly to the printed circuit board.

4. The system of claim 1, wherein at least one of the mounting systems is configured to mount to a canister flush valve.

5. The system of claim 1, wherein the flow rate date is captured at periodic intervals during a flow event by the event processing system.

6. The system of claim 5, wherein the periodic intervals occur in the range of every one to three seconds.

7. The system of claim 5, wherein the event processing system includes a communication system for communicating flow rate data to a remote service.

8. The system of claim 1, wherein the probes have a gap of approximately 0.1 inch.

9. The system of claim 1, wherein the event processing system provides a voltage potential of between 0.7 and 1.3 volts between the probes.

10. The system of claim 9, wherein the voltage potential can be programmatically varied.

11. A universal fluid flow sensor system installable in a toilet tank, comprising:
    a housing that contains an event processing system;
    a flow sensor that provides flow rate data to the event processing system, the flow sensor having an inlet adapted to receive an inflow of water from a fill tube and an outlet adapted to expel an outflow;
    a universal stem that extends from the housing and includes at least two different mounting systems, wherein the universal stem includes an elbow assembly configured to receive and redirect the outflow; and
    a pair of probes positioned in parallel within the elbow assembly, wherein the probes activate the event processing system in response to a detection of water contacting both probes.

12. The system of claim 11, wherein the event processing system is implemented with a printed circuit board and wherein the flow sensor includes a set of output pins that are coupled directly to the printed circuit board.

13. The system of claim 12, wherein the probes are coupled directly to the printed circuit board.

14. The system of claim 11, wherein at least one of the mounting systems is configured to mount to a canister flush valve.

15. The system of claim 11, wherein the flow rate date is captured at periodic intervals during a flow event by the event processing system.

16. The system of claim 15, wherein the periodic intervals occur in the range of every one to three seconds.

17. The system of claim 11, wherein the event processing system includes a communication system for communicating flow rate data to a remote service.

18. The system of claim 11, wherein the probes have a gap of approximately 0.1 inch.

19. The system of claim 11, wherein the event processing system provides a voltage potential of between 0.7 and 1.3 volts between the probes that can be programmatically varied.

* * * * *